United States Patent
Basilico

Patent Number: 5,864,535
Date of Patent: Jan. 26, 1999

[54] NETWORK SERVER HAVING DYNAMIC LOAD BALANCING OF MESSAGES IN BOTH INBOUND AND OUTBOUND DIRECTIONS

[75] Inventor: Albert Richard Basilico, Raleigh, N.C.

[73] Assignee: International Business Machines Corporation, Armonk, N.Y.

[21] Appl. No.: 715,506

[22] Filed: Sep. 18, 1996

[51] Int. Cl.⁶ .................................................. H04L 12/56
[52] U.S. Cl. ........................................... 370/231; 370/392
[58] Field of Search ................................. 370/217, 218, 370/230, 231, 235, 389, 392, 395, 401, 462, 463, 474; 340/825.52, 825.79; 395/200.62, 200.63, 200.64, 200.65, 200.68, 200.8

[56] References Cited

U.S. PATENT DOCUMENTS

| | | | |
|---|---|---|---|
| 4,845,722 | 7/1989 | Kent et al. | 370/388 |
| 5,084,871 | 1/1992 | Carn et al. | 370/462 |
| 5,371,852 | 12/1994 | Attanasio et al. | 370/401 |
| 5,583,868 | 12/1996 | Rashid et al. | 370/397 |

Primary Examiner—Alpus H. Hsu
Attorney, Agent, or Firm—Joscelyn G. Cockburn

[57] ABSTRACT

A communications including a server having multiple entry ports and a plurality of workstations dynamically balances inbound and outbound to/from the server thereby reducing network latency and increasing network throughput. Workstations send data packets including network destination addresses to a network switch. A header is prepended to the data packet, the header identifying a switch output or destination port for transmitting the data packet to the network destination address. The network switch transfers the data packet from the switch input port to the switch destination output port whereby whenever the switch receives a data packet with the server address, the data packet is routed to any available output port of the switch that is connected to a Network Interface Card in the server. The switch includes circuity for removing the routing header prior to the data packet exiting the switch. The server includes circuity for returning to the workstation the address of the first entry port into the server or other network device that has more than one Network Interface Card installed therein.

4 Claims, 5 Drawing Sheets

NETWORK SERVER HAVING DYNAMIC LOAD BALANCING OF MESSAGES IN BOTH INBOUND AND OUTBOUND DIRECTIONS

BACKGROUND OF INVENTION

1. Field of the Invention

This invention relates to communication systems. More particularly, the invention relates to a server-workstation network with dynamic load balancing of messages in both the server inbound and outbound directions.

2. Related Patent Application

This patent application is related to copending U.S. Pat. application, Ser. No. 08/297,469, filed Aug. 29, 1994 which is a U.S. counterpart application of UK Patent Application GB 2281793, published Mar. 15, 1995 and filed Nov. 9, 1993 by G. D. Wallis et al and assigned to the same assignee as that of the present invention.

3. Description of the Prior Art

Routing, bridging and switching are existing techniques to optimize performance between workstations and servers. Recently, load balancing software has been introduced to further improve performance between work stations and servers. Load balancing software allows you to place multiple Network Interface Cards (NICs) into a server and attach the cards to one logical network. In addition, multiple balanced networks can be connected to one server. Normally, under load balancing software or other operating systems, a system administrator would assign a unique address to each NIC. With load balancing software, the NICs can be bound to one logical address, providing load sharing (balancing) across the server bus.

In operation, load balancing software uses dynamic balancing for outgoing traffic (data from the server to the workstation) and static balancing for incoming traffic (from the workstation to the server).

Dynamic balancing works by sending packets to each NIC in turn. For example, with four NICs in the server, the first packet is routed to NIC number 1; the second packet to NIC number 2; the third packet is routed to NIC number 3; the fourth packet to NIC number four; such that each NIC transmits every fourth packet.

Static balancing works differently. When a workstation wishes to connect to a server, it finds the Media Access Control (MAC) layer destination address of the server by sending a request, for example, an Address Resolution Protocol (ARP) on to the network. The address returned by the server in response to the ARP request is used by that workstation until further notice. The software assigns response addresses in round-robin fashion. NIC number 1 is assigned to workstations 1, 5, 9 and 13; NIC number 2 is assigned to workstations 2, 6, 10 and 14; NIC number 3 is assigned to workstations 3, 7, 11 and 15 and so forth. If, for example, workstations 1, 5 and 9 all transmit essentially simultaneously (with static balancing) the server NICs will become unbalanced. That is, NIC number 1 will be overloaded while NICs 2–4 will be idle. As a result, the latency for each workstation will increase and the throughput on the network will decrease by the unbalanced loading of the NICs.

The present invention is directed to improving both the latency and the throughput on a network having a plurality of workstations coupled through a network switch to a server having multiple entry ports.

The prior art addressing load balancing on related networks is as follows:

U.S. Pat. No. 5,031,089 issued Dec. 30, 1988, describes a dynamic resource allocation scheme for distributed heterogeneous computer systems. A decentralized resource sharing scheme is distributed over several compute engines in the network. The disclosure requires a computation of a "workload value" and the transmission thereof to all nodes on the network.

U.S. Pat. No. 5,025,491 issued Oct. 26, 1989, describes dynamic address binding in communication networks. The '491 patent describes the relocation of servers, for example in the event of a "crash", and the rerouting of messages to a new server.

U.S. Pat. No. 5,271,003 issued Mar. 9, 1990, describes an internal routing method for load balancing. The '003 patent relates to rerouting messages in the event of a failed "message handling processor" in "circuit switched" networks.

U.S. Pat. No. 5,193,151 issued Aug. 30, 1989, describes a delay based congestion avoidance in computer networks. The '151 patent discloses a method to reduce traffic load based on a metric such as round-trip delay for a message and its associated acknowledgement.

U.S. Pat. No. 5,249,290 issued Feb. 22, 1991, describes a client/server computer network where the server uses a busy indicator to assign a new client service request to the least busy processor. The '290 patent uses a workload metric to assign "client" server requests to "servers".

U.S. Pat. No. 5,293,488 describes a message routing apparatus that uses a Network Interface Card for each network and a shared routing manager. The '488 patent relates to "filtering" messages or frames in a routing environment to decide whether or not to forward the message or frame to a particular network.

U.S. Pat. No. 5,241,677 describes a multi-processor system and a method of load balancing. The '677 patent balances the computational load on processors to maximize multi-processing efficiency.

IBM Technical Disclosure Bulletin, Volume 37, Number 07, published Jul. 1994, describes a remote log-in program to balance processing load. The publication discloses to assigning a "client" to the least loaded "server" as measured by a non-specific metric.

None of the prior art describe a communication network including a network server with multiple Network Interface Cards coupled to a plurality of workstations through a network switch, the in-bound and out-bound messages to/from the server being dynamically balanced to improve latency, throughput and recovery from fault conditions on the network.

SUMMARY OF THE INVENTION

An object of the invention is a communication network with improved latency and throughput.

Another object is to provide a communication network including multi-port server which always returns to a workstation the address of the first port installed in the server.

Another object is to provide a multi-port server having dynamically balanced network interface cards for in-bound and outbound messages from/to a plurality of workstations.

Another object is to provide a multi-port server including a plurality of Network Interface Cards which are made "route equivalent" for inbound messages.

Another object is to provide a network switch which dynamically routes in bound messages to a first available port in a multiple port server.

Another object is to provide a network switch which matches a designated address for a data packet to a particular switch port.

Another object is to provide a method of dynamically balancing inbound and outbound messages between a plurality of workstations and a multi-port server.

These and other objects, features and advantages are achieved in a communications network including a server having multiple entry ports, each port served by a channel coupled to a plurality of workstations through a network switch. Each workstation includes a Network Interface Card (NIC) sends/receives data packets to/from the switch after obtaining a Media Access Control (MAC) address of a NIC in the server with which it wishes to communicate. Each workstation NIC transmitting a packet to the server receives in return an address of the first entry port into the server or other network device that has more than one network interface card installed. The MAC address is stored by the workstation for future data packet transmissions. The workstation is connected to an associated input port of the network switch. The switch includes a destination port connected to each server port through a channel. The switch includes means to prepend a routing header to a data frame or packet transmitted to the switch by a workstation, the header identifying a particular destination port according to the destination of the data frame. The switch associates a destination port number with a server NIC address using, for example, a content addressable memory and a processor with a look-up table. The switch includes means to move the packet from the input port to the particular output or destination port through a medium, such as a bus and/or cross-bar switch "fabric" using the header address. The switch hardware determines that the destination port of a packet matches a particular switch destination port, and does not have a unique output routing; that is, a packet may be directed to the server through one or more channels. Before transmitting a packet to the server, the switch strips the routing header from the data packet. The switch determines whether the particular switch destination port is currently busy, that is, processing a packet. If free, the first switch destination output port matching the packet header accepts the packet and provides a connection to the first server port. If the first switch destination port is busy, the second switch destination port matching the packet header accepts the packet and provides a connection to the associated server Network Interface Card. The second switch destination port only responds if the first switch destination port is busy as indicated, for example, by a "busy bit". If the second switch destination port is also busy, the third switch destination port matching the packet header accepts the packet and provides a connection to the associated server NIC. This process continues until a switch destination output port is available to transmit the packet to the server. The availability of any server NIC to a workstation provides inbound dynamic load balancing and significantly better performance than a static balanced server, which is the case for present day servers.

Summarizing, a communication network has been described which has full-duplex traffic load balancing in a workstation-server environment. The network provides improved latency, throughput and superior recovery from fault conditions.

DETAILED DESCRIPTION OF A PREFERRED EMBODIMENT

Figure 1:
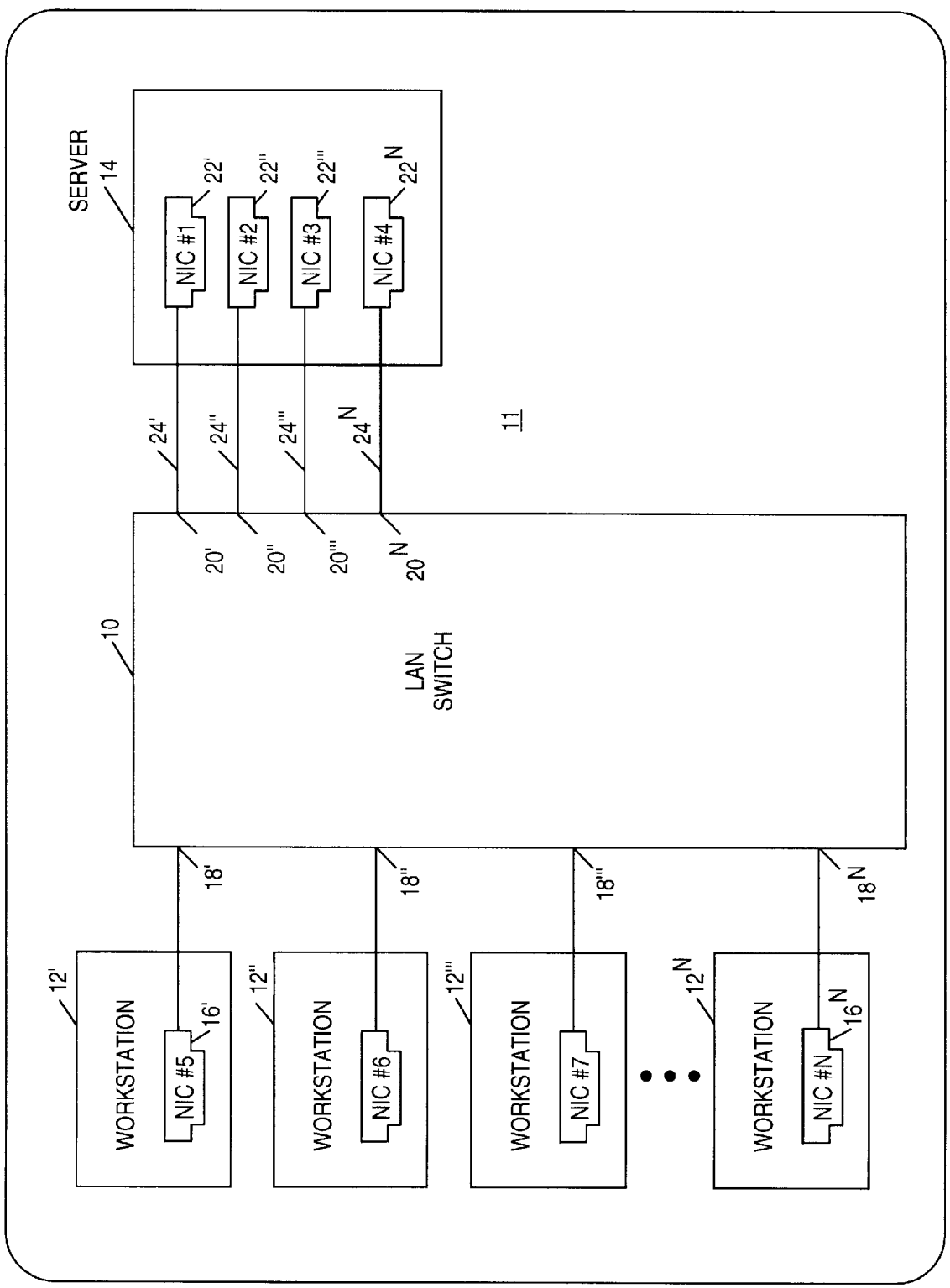
FIG. 1 is a block diagram of a communications network incorporating the principles of the present invention.

In FIG. 1 a network switch 10 for a local area network 11 is coupled to a plurality of workstations 12'-12" for transmitting/receiving data packets or frames to be transmitted/received to/from a multi-port server 14. Each workstation includes a Network Interface Card 16' ... 16" for transmitting and receiving data packets to and from the server 14. Each workstation is associated with a switch input port 18' ... 18". The switch 10 includes a plurality of destination output ports 20' ... 20", each output port associated with server Network Interface Card 22' ... 22" through a channel 24' ... 24". The switch 10 is adapted, as will be described hereinafter, to associate a destination port 20' with the server address whereby whenever the switch transmits a data frame or packet from a workstation to a network destination address associated with the server, the switch will route the frame to a particular output or destination port of the switch that is connected to a Network Interface Card in the server.

Figure 2:
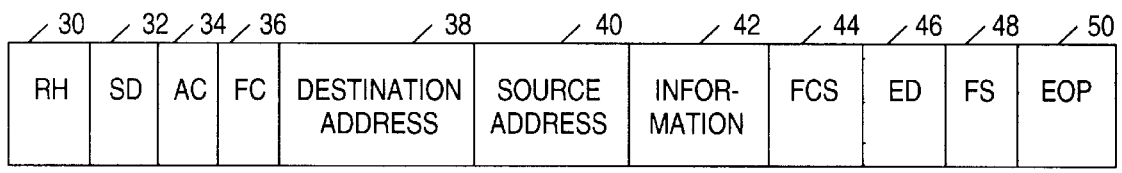
FIG. 2 is a format for a data packet or frame transmitted by a workstation to a multi-port server in the communications network of FIG. 1.

In FIG. 2, an IBM Token-ring Network Frame Format 28 includes a routing header field 30 which is prepended to the data frame 28 by the switch 10, as will be described hereinafter. The routing header 30 is assigned a value associated with a switch destination port 20' connected to a server Network Interface Card. The data frame 28 includes a start delimiter 32; access control field 34 and frame control field 36. A destination address field 38; source address field 40 and information field 42 precede a frame check sequence field 44; end delimiter 46 and frame status field 48. An end of packet indicator 50 is also appended to the frame 28 by the switch to further identify the routing header 30. Both the routing header 30 and end of packet indicator 50 are stripped from the frame by the switch before transmission of the data frame to the output port 20', as will be further described hereinafter.

The switch transmits the data frame or packet to the server 14 through a destination port 20' serving the MAC address for the frame. An address is returned by the server to the workstation. The address returned to the workstation is always the address of the first Network Interface Card installed in the server and is not assigned in a round-robin order as in the case of static load balancing for servers.

Figure 3:
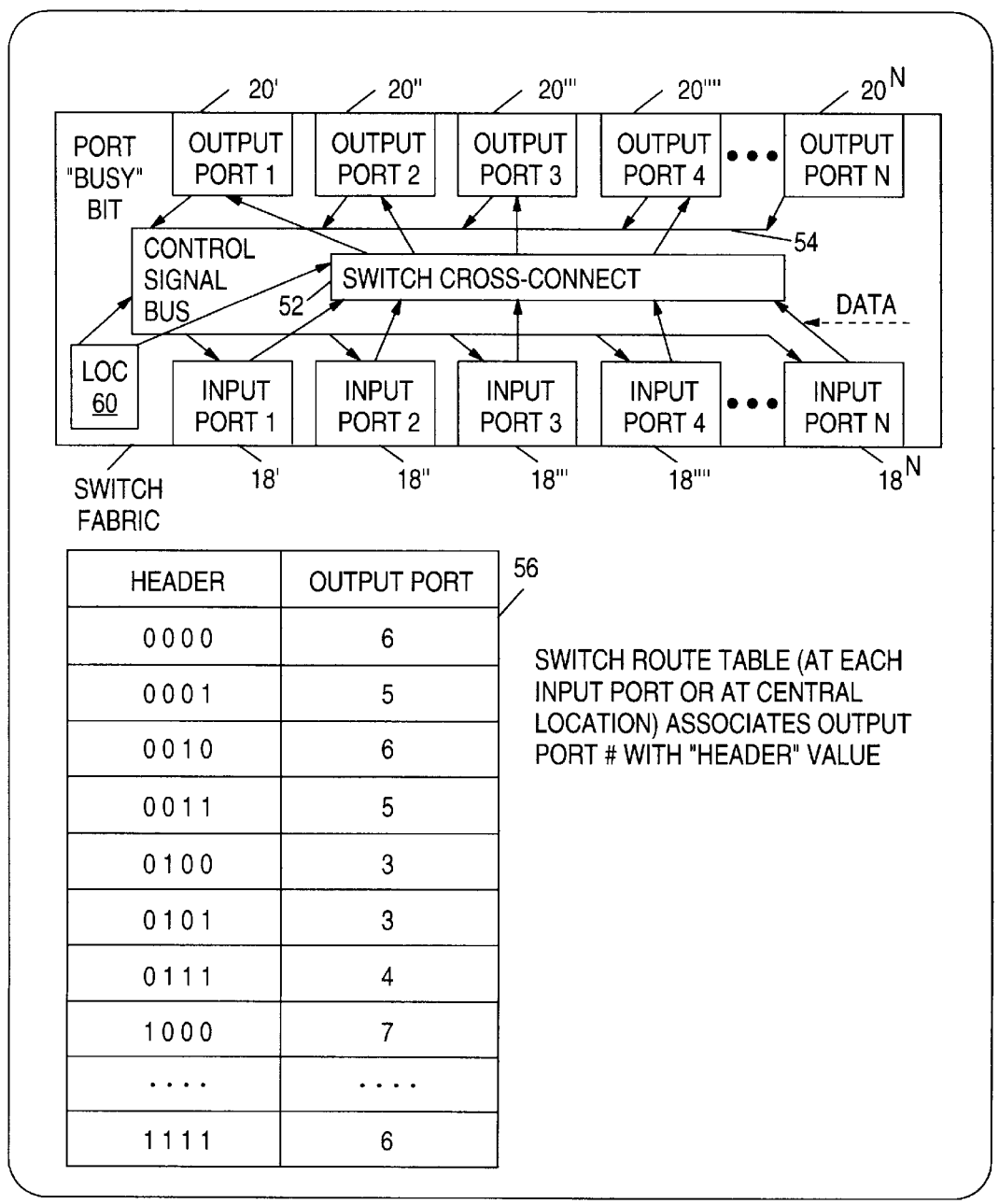
FIG. 3 is a detailed circuit diagram of a network switch included in the communications network of FIG. 1.

In FIG. 3, each workstation Network Interface Card 16' .. 16" (See FIG. 1) is connected to an associated switch input port 18'- ... 18", all input ports being connected to a server address locator (not shown) which associates a switch destination port number with a MAC address in a data frame transmitted by the workstation to the switch, as will be described in conjunction with FIG. 4. Each input port is also connected to an output or destination port 20' ... 20" through a cross-connect switch 52. Each destination port 20' is connected to a server network interface card 22' though a channel 24' (See FIG. 1) and to an input port 18' through a control signal bus 54. Each output or destination port is assigned a value which is selected by the switch 52 according to the header code shown in the table 56 and embodied in the data frame.

Figure 4:
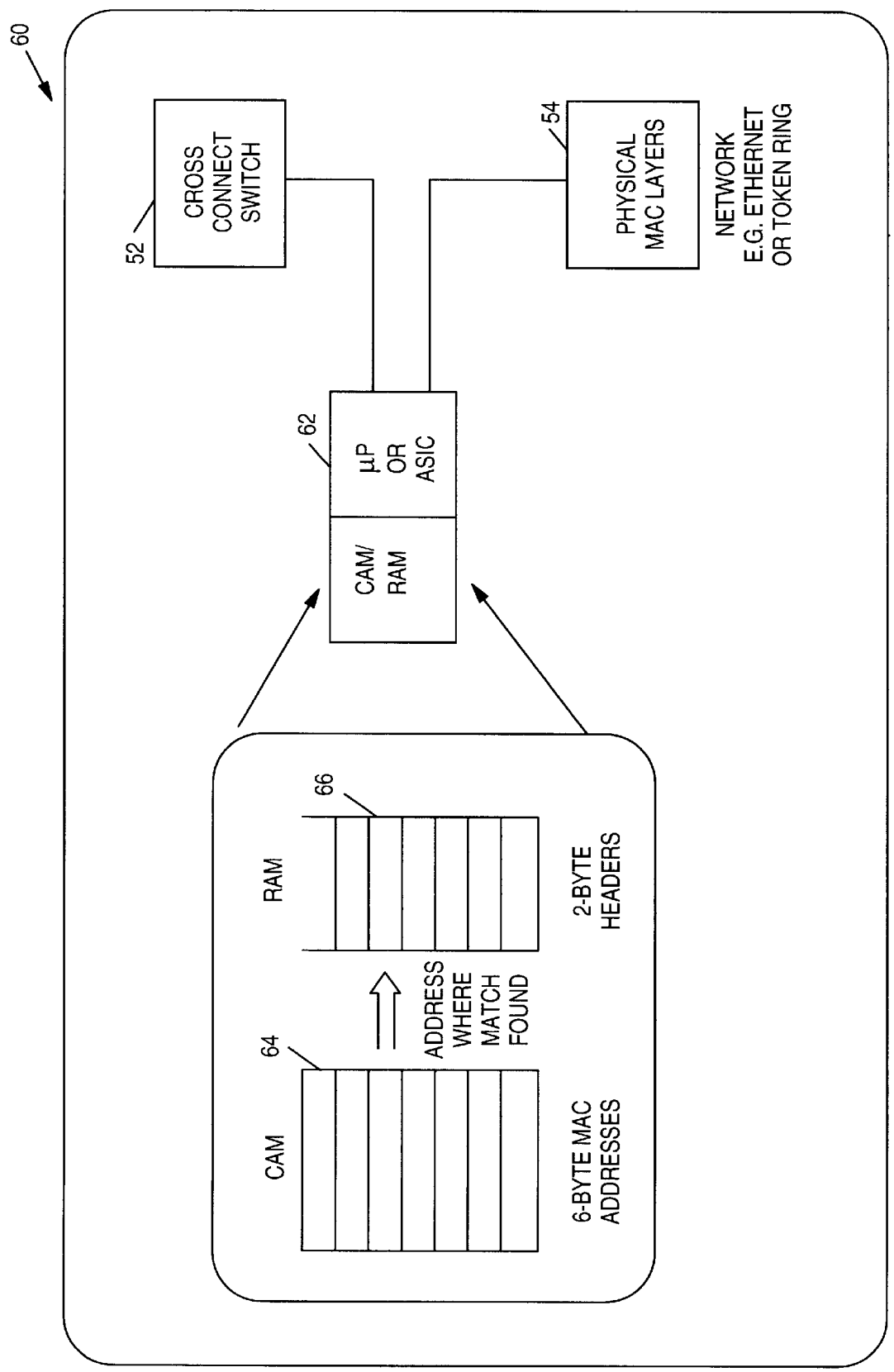
FIG. 4 is a representation of circuitry included in FIG. 3 for associating a switch port header with an address for a Network Interface Card in the multi-port server of FIG. 1.

In FIG. 4, a destination address locator 60, connected to the switch 52 and the control signal bus 52 includes a microprocessor or application specific integrated circuit (ASIC) 62 coupled to a content addressable memory (CAM) 64 and a random access memory (RAM) 66. The microprocessor 62 stores a destination address field 38 for a data frame 28 (See FIG. 2) in the content addressable memory 64. The address stored in CAM 64 is used as an entry into a table look-up contained in the RAM 66. The table look-up provides a code which indicates the address of the network interface card with which the transmitting workstation wishes to communicate. The code is embodied in the header 30 (See FIG. 2) is prepended to the frame by the processor 62 before transmitting the frame to the cross-connect switch 54. The destination port number is provided as an input to the switch 54 which directs the processor to supply the packet to the designated output port.

In the event of a hardware failure, for example, a NIC or cable failure existing load balancing software in prior art networks detect the problem and distribute the traffic through the remaining operational NICs. If the failed NIC is repaired and brought back on line, existing load balancing solutions dynamically restore balancing of packets outbound from the server only. Static balancing of packets inbound to the server only occur on a subsequent login of the client workstations. The login process may not occur for many hours or even days, resulting in reduced network performance in the interim. In contrast, the present invention immediately redistributes the traffic both inbound and outbound yielding full duplex dynamic balancing.

Now turning to FIGS. 5A and 5B, the process for dynamically balancing inbound and outbound data packets to and from a server will be described, as follows.

Figure 5A:
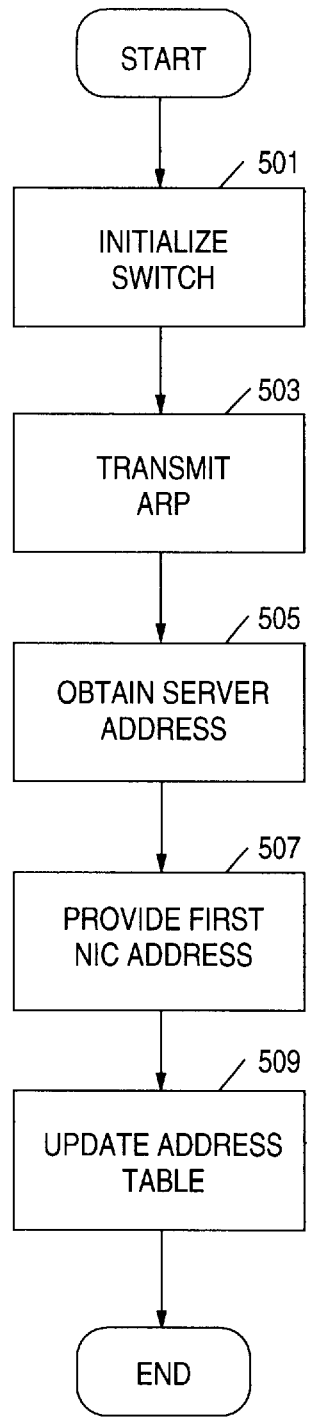
FIG. 5A is a flow diagram for establishing in a multi-port server a MAC address for a workstation in the communications network of FIG. 1.

In FIG. 5A the network switch 10 is activated for processing messages between the workstation and the server.

The switch activation process is entered in a step 501, in which the switch is initialized from a "master" processor after power on or manual reset. The processor sets the communication channel speeds and defines any channel groups.

In step 503, the switch transmits on the network an address resolution protocol which maps all MAC addresses connected to each communication channel.

In step 505, a work station queries the network for a MAC address of a server with which it wishes to communicate by sending a data frame to a "Name Server" at a known address fixed by a network administrator or by convention.

In step 507, the queried server responds with the MAC address of the first network interface card installed in the server.

In step 509, the work station updates its address table with the MAC address provided by the queried server, and the switch activation process ends.

Figure 5B:
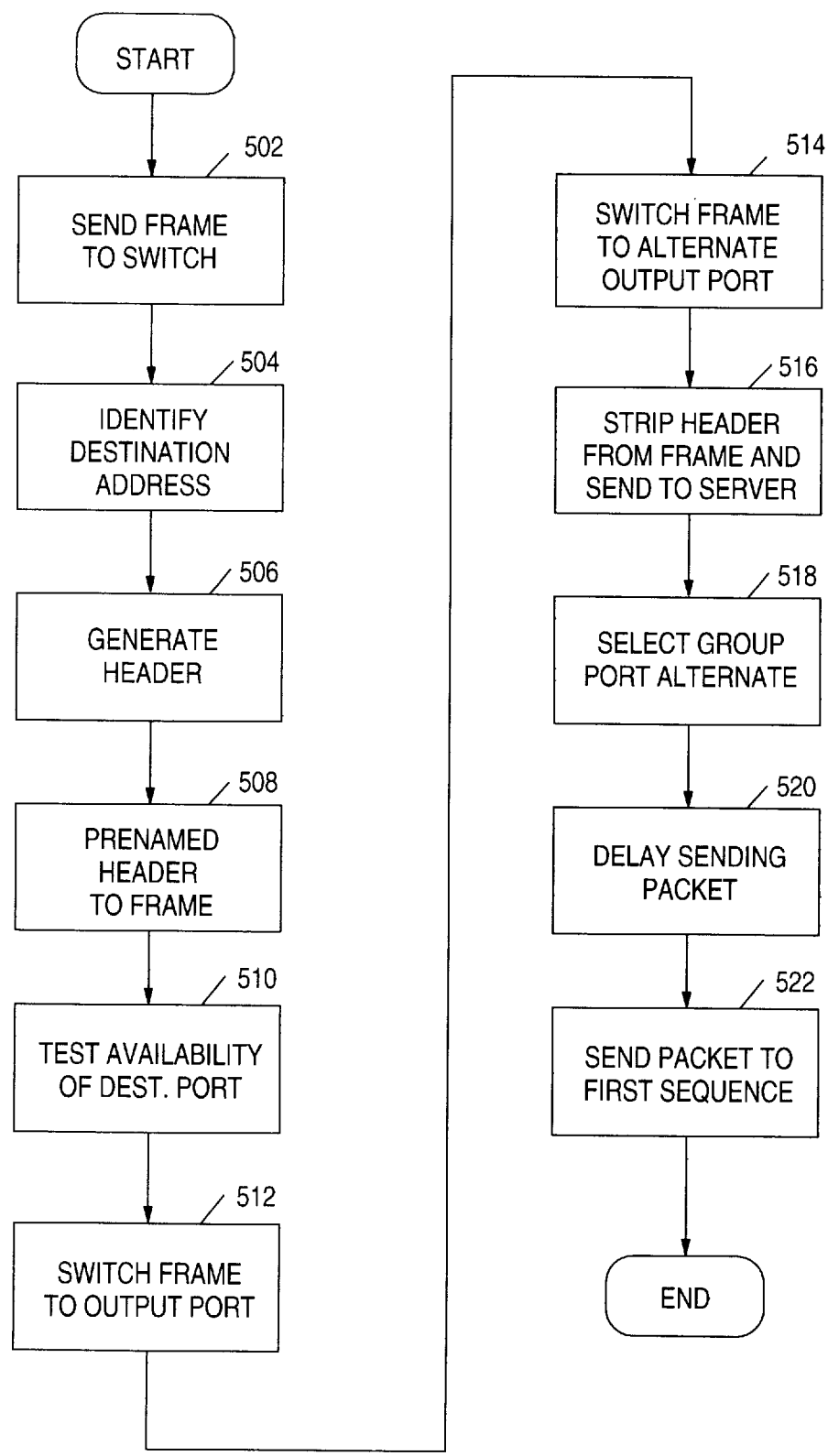
FIG. 5B is a flow diagram describing the data flow for a packet sent from a workstation to the multi-port server in the communications network of FIGS. 1 and 3.

In FIG. 5B the network data flow process is entered in a step 502 in which a workstation sends a data frame to the switch, the frame including a destination address for the server with which it wishes to communicate.

In step 504, the switch includes a Media Access Controller chip (not shown) which receives the destination address followed by the remainder of the data frame.

In step 506, a header is generated for the data frame from the destination address via the CAM/RAM lookup or other switch mapping method.

In step 508, the header is prepended to the data frame together with an end of packet indicator in the locator 60, and transmitted to the cross-connect switch 54.

In step 510, the switch 54 tests the header to determine that the data frame matches the designated switch output for the destination address included in the data frame.

In step 512, the switch 54 tests that a destination port does not have a unique output routing, e.g. is part of a group and whether the destination port is currently busy. If the specified output or destination port is free, the packet is sent to the specified output port or destination port.

In step 514, If the specified output port is busy, the switch 54 checks to determine if other output ports are grouped with the specified output port.

In step 516, before the data frame is sent to the specified output port, the header and end of packet indicator are stripped from the frame.

In step 518, if another port is grouped with the busy port, steps 512 and 514 are repeated with the grouped port as the destination of the data frame.

In step 520, if there are no additional ports grouped with the busy port, the data frame is stalled until the specified port or port in the same group becomes available.

In step 522, the packet is transmitted to the first NIC channel of the server, which if busy transfers the packet to the second, third, etc. NIC available to send the packet to the destination address, after which the process ends. In this manner, the packet load on the server is dynamically balanced, that is the packet load is distributed among the server NICs according to their workload which improves network latency and throughput.

While the invention has been described in a specific embodiment, it is apparent that various modifications may be made thereto without departing from the spirit and scope of the invention as defined in the appended claims.

I claim:

1. In a communications network including a server having multiple entry ports coupled to a plurality of workstations through a network switch, a method of dynamically balancing in-bound and out-bound messages to/from the multiple entry port server comprising the steps of:

a) initializing the network switch from a master processor;

b) transmitting on the network an address resolution protocol using the network switch, the address resolution protocol mapping all medium accesses control addresses connected to each channel in the communication network;

c) querying the communication network for a medium access control address of a server with which a workstation wishes to communicate;

d) responding to the workstation with a medium access control address for the server using the server with which the workstation wishes to communicate;

e) updating the address table of the workstation with the medium access control address of the responding server;

f) receiving a data packet from the workstation at the network switch, the data packet containing a destination address of a server;

g) generating and prepending a header to the data packet identifying a network interface card of server to which the data frame is directed;

h) testing the header to determine that the data frame matches a designated switch output port for the destination address included in the frame;

i) testing the designated switch output port to determine if busy;

j) determining if other switch output ports grouped with the designated switch output port are available if the designated switch output port is busy;

k) stalling the transmission of the data frame if the designated or grouped destination ports are busy until such designated or grouped destination ports are available; and l) transmitting the data frame to the first network interface card in the server which if busy transfers the data frame to a network interface card in the server which is not busy.

2. The method of claim 1 further comprising the step of stripping the header from the data frame before transmission to the server.

3. The method of claim 2 further comprising the step of forming and storing a table in the network switch, the table containing a listing of destination output ports of the switch versus server destination addresses contained in the header.

4. The method of claim 3 further comprising the step of switching a data frame to an output port designated in the table using a cross connect switch coupling input and output ports.

* * * * *